United States Patent [19]
Cho

[11] Patent Number: 5,339,192
[45] Date of Patent: Aug. 16, 1994

[54] STRUCTURE OF BACK MIRROR FOR VEHICLE

[76] Inventor: Seong H. Cho, Usung Apt. 13-302, Sam-dong 146-71, Uiwang-si, Kyongki-do, 437-040, Rep. of Korea

[21] Appl. No.: 997,927

[22] Filed: Dec. 29, 1992

[30] Foreign Application Priority Data

Dec. 30, 1991 [KR] Rep. of Korea ............... 25105/1991

[51] Int. Cl.$^5$ ............... G02B 7/18; B60R 1/06
[52] U.S. Cl. ............... 359/841; 359/877; 248/479
[58] Field of Search ............... 359/841, 843, 844, 872, 359/877; 248/478, 479, 900

[56] References Cited

U.S. PATENT DOCUMENTS

| | | | |
|---|---|---|---|
| 4,247,173 | 1/1981 | Vitaloni | 359/841 |
| 4,969,727 | 11/1990 | Harloff et al. | 359/841 |
| 4,998,812 | 3/1991 | Hou | 359/841 |
| 5,086,357 | 2/1992 | Mittelhauser et al. | 359/841 |
| 5,166,832 | 11/1992 | Zychowicz | 359/841 |

FOREIGN PATENT DOCUMENTS

| | | | |
|---|---|---|---|
| 0092131 | 5/1985 | Japan | 359/841 |
| 2244965 | 11/1991 | United Kingdom | 359/844 |

*Primary Examiner*—Ricky D. Shafer
*Attorney, Agent, or Firm*—Sandler, Greenblum & Bernstein

[57] ABSTRACT

The present invention relates to a structure of vehicle back mirror which is provided at an external side portion of a vehicle, and which is made such that the back mirror is folded and unfolded by operation of a handling button provided within the vehicle. A forward and reverse rotation motor is provided within an interior of the back mirror. The back mirror includes a fixed member, a moving member, a band spring provided on a top surface of a gear and is extended and contracted by a driving force of the motor, so that the moving member, which is firmly fixed to an end of the band spring, is folded and unfolded within a predetermined angle range.

2 Claims, 4 Drawing Sheets

STRUCTURE OF BACK MIRROR FOR VEHICLE

BACKGROUND OF THE INVENTION

The present invention relates to a structure of back mirror for a vehicle which is attached to an external side surface of the vehicle to be used. And, more particularly, the invention is so made so that a forward and reverse rotation motor and a connecting member (leaf spring) extending and contracting in its length by a driving force of this motor are provided within the interior of a back mirror, and the back mirror is folded and unfolded by the handling of a driver, so that in case of running on a narrow alley or parking thereon, a vehicle can more safely run or park by folding the back mirror whereby minimizing the vehicle width, and the folding or unfolding of said back mirror is made to be automatically or semi-automatically and voluntarily adjusted by an adjusting switch provided within an interior of the vehicle, so that it is directed to provide a convenience to a user (driver).

Conventional back mirrors are constructed such that a moving member is to be folded and unfolded by an artificial external force, and generally the following two types of structures are widely used.

As a first type, there has been a back mirror having a structure in which a moving member (a side attached with the mirror) is rotated by an angle of 80 degrees around an axis of hinge connected with a fixed member (a side fixed to the vehicle body) to be folded when folding by an artificial external force, and then said state is maintained until the back mirror is unfolded again by an artificial force.

As a second type, there has been also a back mirror having a structure in which a coil spring is provided between the moving member and the fixed member, so that folding occurs when folding by forcibly applying an external force, but it is immediately returned (unfolded) to an original position when releasing the external force.

On the other hand, since as above-described, any type of back mirror should be folded by having help of a driver or his/her passenger in case of intending to fold at a narrow alley and the like, a problems may occur upon using, particularly in case of the latter, since the moving member of the back mirror constantly maintains a unfolded state by the returning force of the coil spring, the running or parking on the narrow alley was difficult, and moreover, when one would be careless at a slightest moment, an accident causing a dent and the like may occur, not only the vehicle but also to another vehicle.

Accordingly, a matter capable of solving these problems makes the running or parking of other vehicle to be very easy if the back mirror is folded when not only a person's own vehicle but also another's vehicle parks in a narrow place.

BRIEF DESCRIPTION OF THE DRAWINGS

FIGS. 4(a)–4(c) are schematic diagrams for illustrating the operating states in top view of the present invention, in which:

FIG. 4(a) shows a state that the moving member is unfolded,

FIG. 4(b) shows a state that the moving member is in a middle of folding,

FIG. 4(c) shows a state where the moving member is completely folded at an angle of 90 degrees.

DETAILED DESCRIPTION OF THE PREFERRED EMBODIMENTS

The present invention solves the above-described problems, and its construction will be described in more detail with reference to the accompanying drawings.

FIRST EMBODIMENT

Figure 3:
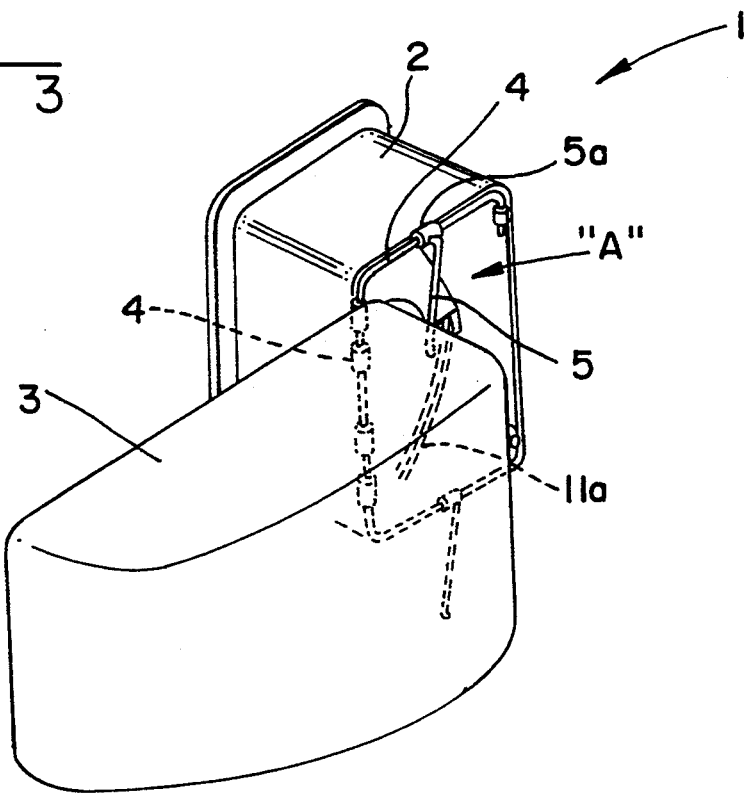
FIG. 3 is a perspective view showing a state that a moving member of the present invention is folded and a creased cover is removed.

A reference numeral symbol 1 in the drawing is a back mirror, and which includes a fixed member 2 firmly fixed to a vehicle body side and a moving member 3 to be folded and unfolded, and the moving member 2 and the fixed member 3 are coupled by a hinge at their front portions via "C"-shaped shaft 4, and the "C"-shaped shaft 4 as shown in FIG. 3, of which top and bottom are fixed to the fixed member 2 side and a supporting bar 5 contacts the moving member 3.

A sleeve 5a is slidably inserted to one end portion, i.e., to the shaft 4 side of the supporting bar 5, and another end portion is fixed to the moving member 3 at a predetermined position thereof, and a flexible thin rubber creased cover 6 is covered throughout the entire surface of the contacting portion of the fixed member 2 and the moving member 3 and thereby serves a function to seal its interior when folding the moving member 3.

Figure 2:
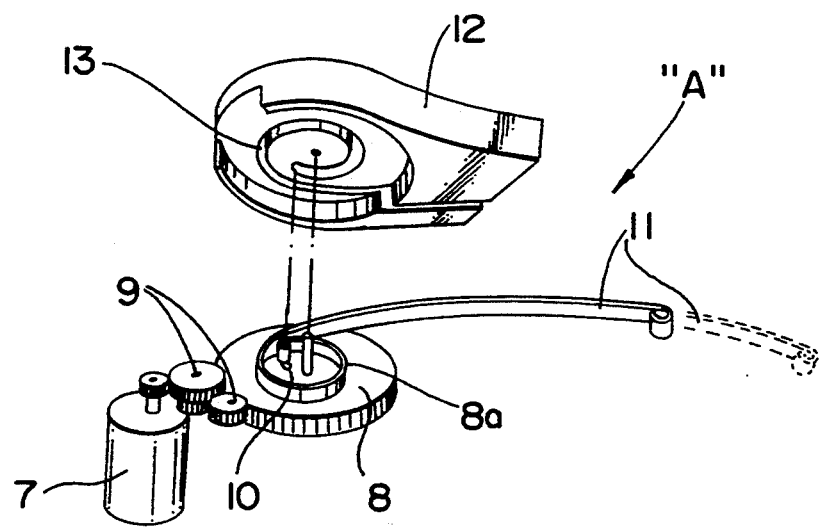
FIG. 2 is an exploded perspective view of a driving device provided within an interior of a back mirror of the present invention.

On the other hand, a driving device "A" as shown in FIG. 2 is provided between the fixed member 2 and the moving member 2 within an interior of the back mirror 1.

A driving device "A" is provided with a forward and reverse rotation motor 7 (hereinafter called a motor) at one side thereof, a relatively bigger gear 8 connected with this is provided at it side portion, and a multiplicity of reducing gears 9 are provided between the motor 7 and the gear 8.

On the other hand, a connecting pin 10 is provided to stand erect on a periphery portion of an upper center shaft 8a of the bigger gear 8, one end of band spring 11 is fixed to this connecting pin 10, and this band spring 11 is wound like a spring a clock.

A reference numeral symbol 12 is a cap for covering on the top of the gear 8.

This cap 12 covers the gear 8 when assembled, and a guiding channel 13 of a groove shape for the band spring 11 is formed in as a snail shape in the interior of the cap 12.

Accordingly, when the cap 12 covers gear 8, the band spring 11 provided on the top surface of the gear 8 is inserted into the guiding channel 13 for the band spring 11, and thereby the band spring 11 moves along the guiding channel 13 as a path.

That is, the gear 8 is cooperatively moved when the motor 7 is driven in forward rotation, and since the cap 12 on the top is fixed, only the gear 8 is naturally rotated the left direction whereby the length of the band spring 11 becomes long, while inversely in when the motor 7 rotates in the reverse direction, the band spring 11 is wound whereby the length becomes short.

Figure 1:
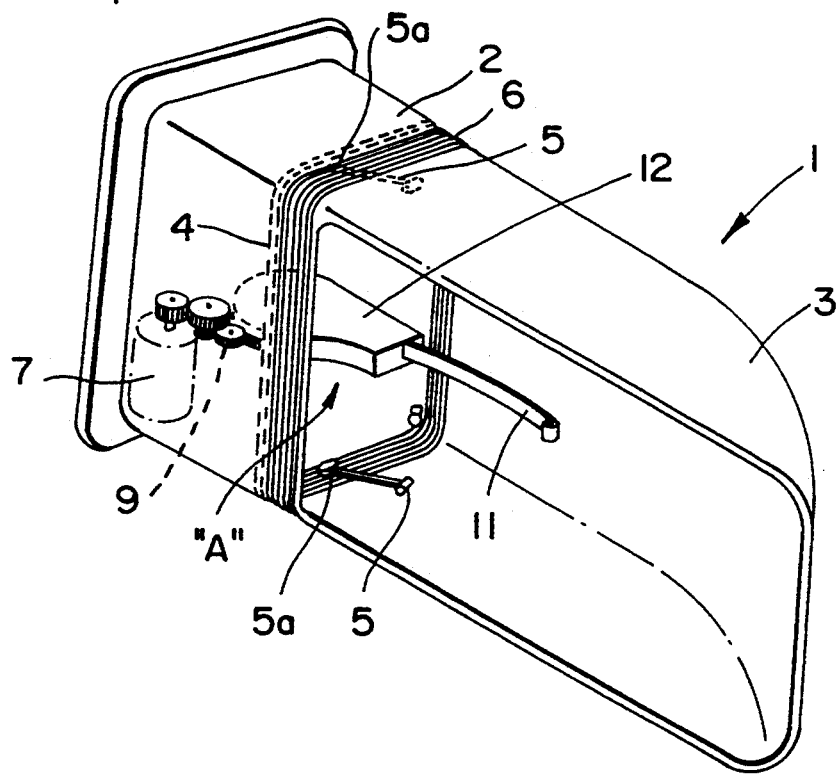
FIG. 1 is a perspective view of the present invention illustrating a mirror being removed and a part of driving device which is shown by an imaginary line.

The driving device "A" is firmly fixed to the fixed member 2 side, and another end portion of the band spring 11 is fixed to a predetermined position of the moving member 3 side as shown in FIG. 1.

Second Embodiment

On the other hand, the driving device "A" can achieve same object by the construction as follows.

Figure 5:
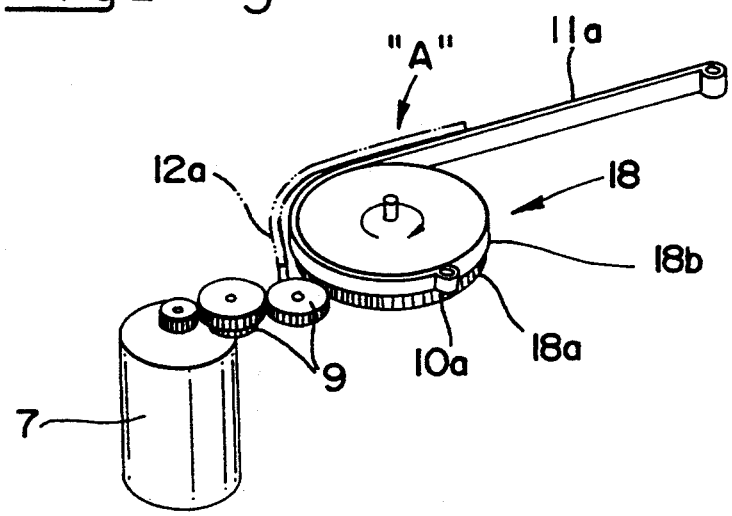
FIG. 5 is a fragmentary magnified perspective view of the driving device in accordance with another embodiment of the present invention.

That is, it is constructed without separately providing the gear 8 and the cap 12 in the first embodiment, as shown in FIG. 5, a gear 18 is formed in which a lower gear 18a formed a bottom portion and a flat disc 18b without a gear formed a top portion and are made as one single body. The lower gear 18a formed at the bottom portion of this gear is meshed with the reducing gears 9, and a band 11a made of metal or hard synthetic resin having a resiliency is provided around the circumference of the flat disc 18b, so that another end portion of the band 11a is extended or contracted when the gear 18 rotates in forward or backward direction by the driving of the motor 7.

At this time, one end portion of the band 11a is fixed to a connecting pin 10a formed at one side of periphery portion of the gear 18, and another end portion is fixed to a predetermined position of the moving member 3 similarly in the first embodiment.

And, only a partitioning wall 12a is simply provided at a periphery of the band 11a around the circumference of the gear 18 without covering with the cap 12 as above, so that the band 11a is not released out to the exterior by its resiliency. And, the structure other than these described is same in the above-described first embodiment.

Figure 7:
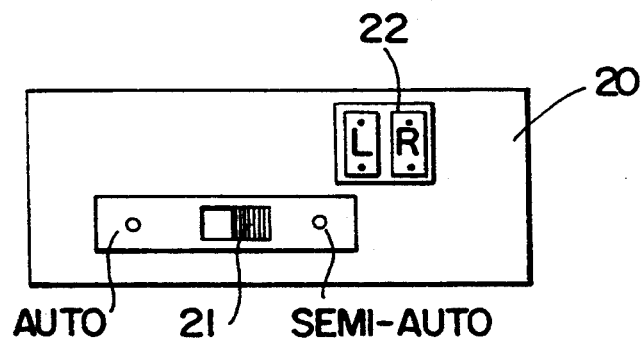
FIG. 7 is a front view showing a back mirror handling panel.

In the above description, although it is described only for the mechanical structure of the present invention, in order to practically handle the device of the present invention, a separate handling member should be provided within a vehicle, and for this purpose, a handling panel 20 as illustrated in FIG. 7 is provided within the vehicle so that a user (driver) can voluntarily shift the switch to the automatic mode or to the semi-automatic mode. For reference, reviewing briefly the operating relation, it will be as follows.

For instance, when the shifting switch 21 is set to the automatic mode, the motor 7 is automatically driven simultaneously with the starting of automobile whereby the moving member 3 is unfolded, and when the starting is made off, the moving member 3 is automatically folded.

On the other hand, when the shifting switch 21 is set to the manual mode, the folding and unfolding of the moving member 3 are handled by the handling of separate button switch 22, and this can be simply handled to control by a construction of the circuitry of FIG. 8.

Hereinafter, reviewing the operation and effect of the present invention, they shall be as follows.

In the present invention, in case the is vehicle running, a driver has to voluntarily control the back mirror 1 handling shifting switch 21.

For instance, in case where the shifting switch 21 is set to an automatic mode, the moving member 3 is unfolded during the vehicle running, and when the engine is turned off, the moving member 3 is automatically folded [refer to FIG.(c)].

That is, in case of turning off the starting of the engine, a driving force of the motor 7 is transferred through the reducing gears 9 to the gear 8, and an end of the band spring 11 set on the top surface of the gear 8 is extended toward the moving member 3 in response to the gear being rotated, and accordingly the moving member 8 is made to be folded around the shaft 4 coupled as a hinge.

Figure 4A:
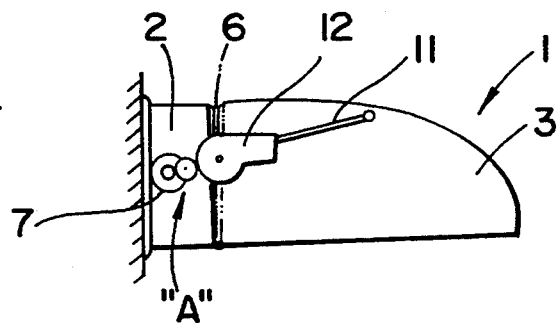
Figure 4B:
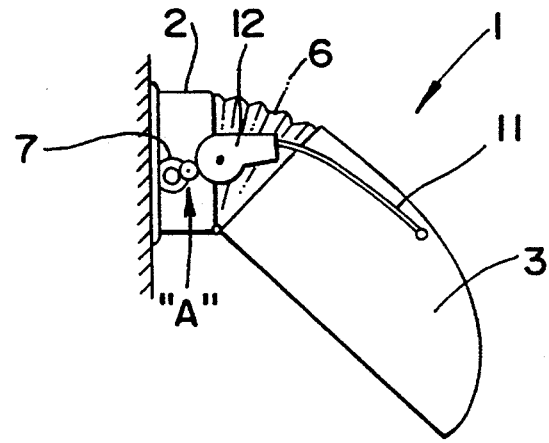
Figure 4C:
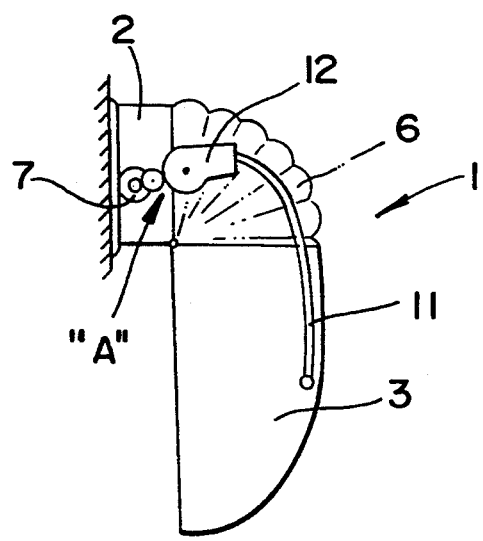
Figure 6:
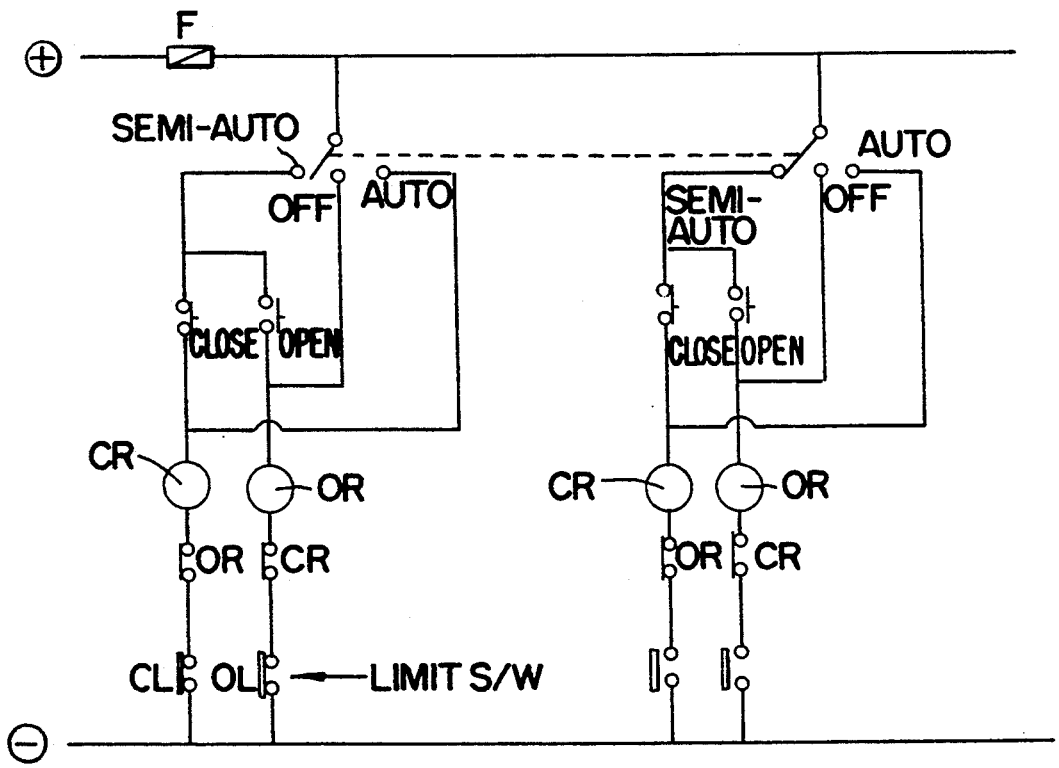
FIG. 6 is a circuit diagram for controlling the back mirror of the present invention.

That is, during the regular running, as shown in FIG. 4(a), the moving member 3 is unfolded whereby confirming of backward and sideward positioning is possible, and when the engine is turned off, the folding is automatically made as a illustrated in FIGS. 4(b)-4(c).

On the other hand, when the shifting switch 21 is shifted to the automatic mode, when the engine is started, the motor 7 rotates forwardly simultaneously with the starting whereby the gear 8 is also forwardly rotated and thereby the band spring 11 becomes wound, and accordingly, the moving member 3 which has been folded becomes unfolded by the pulling of the band spring 11.

And, in case when the shifting switch 21 is shifted to the semi-automatic mode, a driver can appropriately confront with continuing a running in response to the situation of the road being different from the time when the switch is set to the automatic mode as above, i.e., the right side back mirror or the left side back mirror can be freely controlled by the handling of the button switch 22, for instance, it can ba conveniently used in a narrow alley and the like.

And, in the invention of this application, when the moving member 3 is folded, its interior would be exposed to the exterior and thereby not only it is bad in external appearance but also snow or rain water may be entered in rainy weather, but since a crease cover 6 is provided to function as a sealing member, the entering of other foreign material becomes impossible.

On the other hand, reviewing the operation and effect when another driving device "A'" of the second embodiment of the present invention is provided, the driving power of the motor 7 is transferred to the lower gear 18a through the reducing gears 9.

Accordingly, since the lower gear and upper flat disc 18a,18b are structured as one single body, the gear 18 rotates, and in case the gear 18 is rotated, since an end of the band 11a is fixed to the connecting pin 10a, another end of the band 11a is either extended to or contracted from the moving member 3 side, therefore it is also possible to fold and unfold the moving member 3 similarly in the first embodiment, and the handling method and its effect are the same as in above-described first embodiment.

It will be appreciated that the present invention is not restricted to the particular embodiment that has been described hereinbefore, and that variations and modifications may be made therein without departing from the spirit and scope of the invention as defined in the appended claims.

What is claimed is:

1. A back mirror structure comprising:
   a moving member being hinged by a shaft to a fixed member, said fixed member being fixed to a vehicle body so as to be able to fold and unfold, a driving device being provided within an interior of said fixed member, said driving device being firmly fixed to the fixed member, said driving device including a forward and reverse rotation motor, at least one reducing gear, and a driving gear meshing with said at least one reducing gear and surrounded by a cap, a band spring having a first end and a second end, said first end of said band spring being fixed to a connecting pin standing erect on a top surface of said driving gear, and said second end being fixed to said moving member, a guiding channel for the band spring being formed in a groove formed on an interior surface of said cap, said cap covering a top of said band spring, said second end of said band spring being extended or contracted along the guiding channel upon driving of said motor, so that a folding and unfolding of said moving member can be carried out, a flexible creased cover covering throughout an entire surface around a contacting circumferential surface of said fixed member and said moving member, and said shaft coupling said fixed member and said moving member, and being formed in a "C"-shape, and a supporting bar for reinforcing and supporting said fixed member and said moving member being provided at upper and lower portions of said shaft.

2. A back mirror structure comprising:

a moving member being hinged by a shaft to a fixed member, said fixed member being fixed to a vehicle body so as to be able to fold and unfold, a driving device being provided within an interior of said fixed member, said driving device being firmly fixed to the fixed member, said driving device including a forward and reverse rotation motor, at least one reducing gear, and a driving gear, a band spring having a first end and a second end, said first end of said band spring being fixed to a connecting pin formed at a peripheral surface of said driving gear, and said second end being fixed to said moving member, said driving gear being formed as a single body with a lower gear and an upper flat disc, said lower gear being meshed with said at least one reducing gear, and the upper flat disc being meshed with said band spring at its circumference, a guiding channel for the band spring being formed around the circumference of said driving gear, said second end of said band spring being extended or contracted along the guiding channel upon driving of said motor, so that a folding and unfolding of said moving member can be carried out, a flexible creased cover covering throughout an entire surface around a contacting circumferential surface of said fixed member and said moving member, and said shaft coupling said fixed member and said moving member, and being formed in a "C"-shape, and a supporting bar for reinforcing and supporting said fixed member and said moving member being provided at upper and lower portions of said shaft.

* * * * *

UNITED STATES PATENT AND TRADEMARK OFFICE
CERTIFICATE OF CORRECTION

PATENT NO. : 5,339,192
DATED : August 16, 1994
INVENTOR(S) : Seong H. CHO

It is certified that error appears in the above-indentified patent and that said Letters Patent is hereby corrected as shown below:

On the cover page, section [56], line 2 under Foreign Patent
    Documents, change "11/1991" to ---12/1991---.
At column 1, line 29, change "80" to ---90---.
At column 1, line 46, change "a problems" to ---problems---.
At column 1, line 49, change "a unfolded" to ---an unfolded---.
At column 2, line 47, change "2" to ---3---.
At column 2, line 59, change "spring a" to ---spring of a---.
At column 3, line 22, change "formed a" to ---formed at a---.
At column 3, line 41, change "same in" to ---same as in---.
At column 3, line 66, change "is vehicle" to ---vehicle is---.
At column 4, line 18, delete "a".
At column 4, line 24, change "3" to ---8---.
At column 4, line 34, change "ba" to ---be---.
At column 4, line 38, change "it is" to ---is it---.
At column 4, line 39, delete "be".
At column 4, line 40, change "entered" to ---enter---.
At column 4, line 55, change "similarly in" to ---similarly as in---.
At column 2, lines 31-32, "moving member 2 and the fixed member 3" should read --moving member 3 and the fixed member 2--.

Signed and Sealed this

First Day of August, 1995

*Attest:*

*Attesting Officer*

BRUCE LEHMAN

*Commissioner of Patents and Trademarks*